(12) United States Patent
Xing et al.

(10) Patent No.: US 11,287,401 B2
(45) Date of Patent: Mar. 29, 2022

(54) SAMPLE PRETREATMENT METHOD OF MICROEXTRACTION TUBE INJECTION

(71) Applicant: WUHAN SEPENRICH TECHNOLOGIES CO., LTD, Wuhan (CN)

(72) Inventors: Jun Xing, Wuhan (CN); Xiaoyu Ye, Wuhan (CN); Wenyu Huang, Wuhan (CN)

(73) Assignee: WUHAN SPENRICH TECHNOLOGIES CO., LTD, Wuhan (CN)

( * ) Notice: Subject to any disclaimer, the term of this patent is extended or adjusted under 35 U.S.C. 154(b) by 260 days.

(21) Appl. No.: 16/655,644

(22) Filed: Oct. 17, 2019

(65) Prior Publication Data

US 2020/0049672 A1 Feb. 13, 2020

Related U.S. Application Data

(63) Continuation of application No. PCT/CN2018/083215, filed on Apr. 16, 2018.

(30) Foreign Application Priority Data

Apr. 17, 2017 (CN) .......................... 201710250191.0

(51) Int. Cl.
*G01N 30/06* (2006.01)
*G01N 30/18* (2006.01)
(Continued)

(52) U.S. Cl.
CPC ........ *G01N 30/06* (2013.01); *B01J 20/28042* (2013.01); *G01N 1/2214* (2013.01);
(Continued)

(58) Field of Classification Search
CPC ...... G01N 30/06; G01N 1/2214; G01N 1/405; G01N 30/18; G01N 2001/2217;
(Continued)

(56) References Cited

U.S. PATENT DOCUMENTS 5,565,622 A 10/1996 Murphy
5,814,742 A 9/1998 Vissers et al.
(Continued)

FOREIGN PATENT DOCUMENTS

CN 1500540 A 6/2004
CN 202173809 U 3/2012
(Continued)

OTHER PUBLICATIONS

El-Beqqali et al., "Fast and sensitive environmental analysis utilizing microextraction in packed syringe online with gas chromatography-mass spectrometry Determination of polycyclic aromatic hydrocarbons in water," Journal of Chromatography, vol. 1114, pp. 234-238, Publ. Mar. 3, 2006. (Year: 2006).*

(Continued)

*Primary Examiner* — Jennifer Wecker
*Assistant Examiner* — Michael Paul Shimek
(74) *Attorney, Agent, or Firm* — W&K IP

(57) ABSTRACT

Disclosed is a sample pretreatment method of microextraction tube injection, comprising providing a capillary microextraction tube with extracting medium in it as an injector, passing a sample through the capillary micro-extraction tube, during which an analyte is extracted into an extracting medium inside the capillary micro-extraction tube; then, filling the capillary micro-extraction tube with an organic solvent and keeping the filling for a certain period of time, so that the extracted analyte is dissolved in the organic solvent inside the capillary micro-extraction tube to form an injection solution; finally, keeping one end of the capillary (Continued)

micro-extraction tube sealed and inserting the other end directly into an injection port of a gas chromatography, such that the injection solution is automatically ejected out from the capillary micro-extraction tube into the injection port.

4 Claims, 1 Drawing Sheet

(51) Int. Cl.
  *B01J 20/28*   (2006.01)
  *G01N 1/22*   (2006.01)
  *G01N 1/40*   (2006.01)
  *G01N 30/00*   (2006.01)

(52) U.S. Cl.
  CPC ............. *G01N 1/405* (2013.01); *G01N 30/18* (2013.01); *B01J 2220/64* (2013.01); *G01N 2001/2217* (2013.01); *G01N 2030/009* (2013.01); *G01N 2030/062* (2013.01)

(58) Field of Classification Search
  CPC ....... G01N 2030/009; G01N 2030/062; G01N 2030/085; G01N 30/08; G01N 30/16; B01J 20/28042; B01J 2220/64
  See application file for complete search history.

(56) References Cited

U.S. PATENT DOCUMENTS

| | | |
|---|---|---|
| 7,776,615 B2 | 8/2010 | Yuka et al. |
| 2002/0150923 A1 | 10/2002 | Malik |
| 2008/0064115 A1 | 3/2008 | Hiramatsu et al. |
| 2010/0000342 A1 | 1/2010 | Zesiger |
| 2014/0030818 A1 | 1/2014 | Schueler et al. |

FOREIGN PATENT DOCUMENTS

| | | |
|---|---|---|
| CN | 102419355 A | 4/2012 |
| CN | 102636595 A | 8/2012 |
| CN | 102645492 A | 8/2012 |
| CN | 203561538 U | 4/2014 |
| CN | 205920097 U | 2/2017 |
| CN | 106959349 A | 7/2017 |
| EP | 1482840 A2 | 12/2004 |
| JP | 1996094601 A | 4/2015 |
| WO | 2005028061 A2 | 3/2005 |
| WO | 2012033455 A1 | 3/2012 |

OTHER PUBLICATIONS

Internation Search Report of PCT/CN2018/083215, dated Jul. 19, 2018.

Office Action of CN 201710250191.0 dated Oct. 15, 2018.

Office Action of CN 201710250191.0 dated Feb. 5, 2018.

Extended European Search Report of European Application No. 18788140.4.

El-Beqqali A et al: Fast an sensitive environmental analysis utilizing microextraction in packed syringe online with gas chromatography-mass spectrometry, Journal of Chromatography A, Elsevier, Amsterdam, NL, vol. 1114, No. 2, May 12, 2006.

Shuai Fu et al: Determination of polycyclic aromatic hydrocarbons in water samples using online microextraction by packed sorbent coupled with gas chromatographymass spectrometry, Talanta, Elsevier, Amsterdam, NL, vol. 94, Mar. 4, 2012.

Written Opinion of International Application No. PCT/CN2018/083215.

* cited by examiner

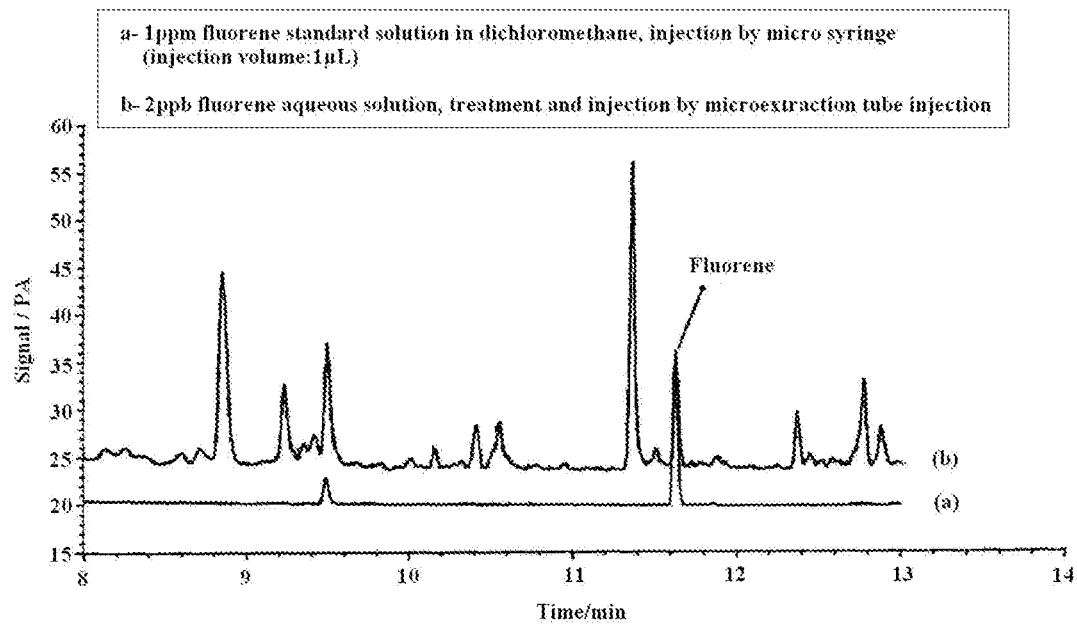

SAMPLE PRETREATMENT METHOD OF MICROEXTRACTION TUBE INJECTION

CROSS-REFERENCE TO RELATED APPLICATIONS

This application is a continuation application of International Patent Application No. PCT/CN2018/083215 with an international filing date of Apr. 16, 2018, designating the United States, and further claims priority benefits to Chinese Patent Application No. 201710250191.0, filed on Apr. 17, 2017. The contents of all of the aforementioned applications are incorporated herein by reference.

TECHNICAL FIELD

The present invention belongs to the field of sample pretreatment, and particularly relates to microextraction tube injection.

BACKGROUND

Sample pretreatment mainly aims to make target compounds in a sample to reach a measurable level by extracting, purifying and concentrating the target compounds, and removing interfering substance in the sample matrix. Traditional sample pretreatment method comprises soxhlet extraction, liquid-liquid extraction (LLE) and the like. However, these methods have the defects of long processing time, complex operation, large organic solvent consumption and the like to different extents. In order to solve the problems, a series of novel sample pretreatment methods have emerged, such as ultrasonic-assisted extraction (USAE), microwave-assisted extraction (MWAE), pressurized liquid extraction (PLE) and supercritical fluid extraction (SCFE), through which the extraction efficiency of the target compounds in the solid-state sample can be effectively improved. Solid-phase extraction, solid/liquid phase microextraction and the like are representative methods for extracting, purifying and concentrating a liquid sample at present. Since the method disclosed by the invention is not related to the extraction of a solid sample, the following only introduces the background related to the pretreatment of a liquid sample.

(1) Solid Phase Extraction (SPE)

Solid phase extraction (SPE) is considered as the most extensively used pretreatment technique to date. The principle of SPE is based on solid-phase adsorption, and target compounds are separated from interfering substances through selective adsorption of the target compounds or interfering substances. Representative devices in SPE are cartridges and discs, and cartridges are most widely used. Later, some new SPE methods emerge, such as magnetic solid-phase extraction (MSPE), matrix solid-phase dispersion (MSPD) extraction and the like. Compared with SPE cartridges, these new SPE methods are mainly different in the procedure of sample loading, and the rest steps are basically the same.

SPE cartridge is an extraction device wherein a solid adsorbent is filled in a syringe cylinder. When sample flows through the SPE cartridge, the analytes are extracted to the adsorbent. The procedure of SPE generally comprises four steps, namely activating, loading, cleaning and eluting. For the SPE, the theoretical enrichment factor of the target compounds depends on the ratio of the volume of the sample solution and the volume of the solution used for analysis and determination. Therefore, in order to improve the sensitivity, the eluent containing the target compounds is concentrated to a certain volume by means of nitrogen blowing and other means, and then sample injection is performed using a micro syringe.

Magnetic solid phase extraction (MSPE) uses a solid adsorbent that contains a magnetic core. In the procedure of MSPE, the magnetic adsorbent is directly dispersed in a liquid sample. After the extraction is finished, the adsorbent which has adsorbed the analytes is recovered by a magnet. Subsequent cleaning, elution and other procedure are basically the same with SPE.

Matrix solid-phase dispersion (MSPD) extraction is mainly used for pretreatment of biological tissue samples, and has the following characteristics: an adsorbent is mixed with chopped biological tissues, and then the mixture is moderately ground in a mortar, so that the sample is further broken by the aid of the adsorbent, and thus the extraction efficiency is improved. Then, the adsorbent-containing adsorbed analytes is separated from the sample, and the analytes are subsequently eluted from the adsorbent according to traditional SPE.

(2) Solid Phase Micro-Extraction (SPME)

Solid phase micro-extraction (SPME) is a solvent-free extraction that integrates sample collecting, concentration and sample injection, and the procedure is simple. A typical device is a fiber solid phase micro-extraction (Fiber SPME). In addition, there are also some new forms, such as in-tube solid-phase micro-extraction (In-tube SPME) and solid-phase micro-extraction stirring bar technology (Stirring bar sorptive extraction, SBSE) and the like. These new forms have their own characteristics, but none of them is free of solvent.

Fiber solid phase micro-extraction (Fiber SPME) is to adsorb analytes on a coating on the surface of a fiber. Fiber solid phase micro-extraction can be hyphenated to either gas chromatography or liquid chromatography. When hyphenated to gas chromatography, the fiber is directly inserted into the injection port, and the extracted analytes are released from the fiber through thermal desorption. When hyphenated to liquid chromatography, an organic solvent is required to elute the analyte, and then injection is performed using a micro syringe.

In-tube solid-phase micro-extraction (In-tube SPME) is to extract analytes into an extraction material contained in a capillary tube, and this technology is mainly hyphenated to liquid chromatography. When hyphenated to gas chromatography, elution is firstly required to obtain an eluent that contains the analytes, and then the eluent is injected using a micro syringe.

Stirring bar sorptive extraction (SBSE) is to adsorb analytes into an extraction material covered on the surface of a stirring bar. SBSE can be hyphenated to either gas chromatography or liquid chromatography. When hyphenated to gas chromatography, the sample can be injected by two methods. In the first method, the analytes are firstly eluted, and then the eluent is concentrated through nitrogen blowing, and finally the concentrated solution is injected using a micro syringe. In the second method, the stirring bar which has extracted the analytes is put into a specially-made device, and heating is performed to gasify the analytes, and then the analytes are introduced with a carrier gas into the injection port of a gas chromatography through a special gas line. When hyphenated to liquid chromatography, the analytes are eluted from the stirring bar, then the eluent is dried by blowing nitrogen, and the concentrated solution is re-dissolved with a mobile phase, and the obtained solution is finally injected using a micro syringe.

(3) Micro Liquid-Liquid Extraction

The principle of micro liquid-liquid extraction (mLLE) is basically the same with traditional liquid-liquid extraction. However, in mLLE a very few amount of organic solvent (hundreds of microliter) are used to extract several hundred milliliters of samples, and the procedure of mLLE is basically the same with traditional LLE. On this basis, some new methods emerged, such as single-drop micro-extraction (SDME), dispersion liquid-liquid micro-extraction (DLLME) and hollow fiber liquid-phase micro-extraction (HF-LPME).

Single-drop micro-extraction (SDME) is characterized in that a proper amount of organic solvent is pushed out from a micro syringe, and the organic solvent forms a drop which is suspended at the tip of the micro syringe needle, then the drop is put into a sample solution or a headspace part of the sample to perform extraction. After the extraction is finished, the drop is withdrawn into the micro syringe, and the organic solvent containing the analytes is injected.

Dispersion liquid-liquid micro-extraction (DLLME) involves using a small amount of organic solvent (with a certain proportion of a solubilizer) as an extraction agent which is dispersed in a sample to perform extraction. After the extraction is finished, the extraction agent is separated through centrifugation and the like, then the extraction agent is sucked out using a micro syringe, and a part of the extraction agent is taken for injecting.

Hollow fiber liquid-phase micro-extraction (HF-LPME) involves using a porous hollow fiber which has pores in its walls as an extraction tube (the extraction solvent is placed inside the channel of the hollow fiber and the pores of its walls), and one end thereof is connected with the needle of the micro syringe, then, the extraction solvent is injected into the extraction tube from the micro syringe, and the extraction tube is immersed in the sample solution, so that the analytes can be extracted into the organic solvent. After the extraction is finished, the extraction solvent is withdrawn into the micro syringe, then the extraction tube is removed, and extraction solvent containing the analytes is injected.

SUMMARY

The present invention aims to provide a novel sample pretreatment method of microextraction tube injection.

In a first aspect, the present disclosure provides a sample pretreatment method of microextraction tube injection, comprising:

providing a capillary micro-extraction tube with extracting medium in it as an injector, passing a sample through the capillary micro-extraction tube, during which an analyte is extracted into the extracting medium inside the capillary micro-extraction tube;

then, filling the capillary micro-extraction tube with an organic solvent and keeping the filling for a certain period of time, so that the extracted analyte is dissolved in the organic solvent inside the capillary micro-extraction tube to form an injection solution; and finally, keeping one end of the capillary micro-extraction tube sealed and inserting the other end directly into an injection port of a gas chromatography, such that the injection solution is automatically ejected out from the capillary micro-extraction tube into the injection port to complete the injection operation for gas chromatography.

Preferably, the present disclosure provides a sample pretreatment method of microextraction tube injection of trace analyte in a sample, comprising:

(1) preparing a micro-extraction injector from a capillary micro-extraction tube;
(2) tightly connecting the micro-extraction injector with a barrel of a syringe, and activating the capillary micro-extraction tube by passing an activation liquid through the capillary micro-extraction tube using an infusion device;
(3) loading a sample solution by passing the sample solution through the capillary micro-extraction tube at a certain flow rate using a constant infusion device;
(4) washing the capillary micro-extraction tube by passing a cleaning liquid through the capillary micro-extraction tube using an infusion device, and removing water inside the capillary micro-extraction tube as much as possible by passing air through the capillary micro-extraction tube;
(5) filling the capillary micro-extraction tube with a proper organic solvent using an infusion device, sealing two ends of the capillary micro-extraction tube with a silicone septum at each end, and standing for a period of time, so that the extracted analyte is dissolved in the organic solvent to form an injection solution; and
(6) finally, opening one end of the capillary micro-extraction tube by taking down the silicone septum thereof, keeping the other end sealed, and inserting the open end directly into an injection port of a gas chromatography, such that the injection solution is automatically ejected out from the capillary micro-extraction tube into the injection port to complete the sample injection operation.

Preferably, in the above methods, the extracting medium inside the capillary micro-extraction tube does not exceed 90% of the total internal volume of the capillary micro-extraction tube.

Preferably, in the above methods, the capillary micro-extraction tube has an inner diameter of 0.05 mm to 0.6 mm, an outer diameter of 0.06 mm to 0.7 mm, and a length of 2 cm to 10 cm.

Preferably, in the above methods, the sample flows through the capillary micro-extraction tube at a flow rate not exceeding 1 mL/min.

Preferably, in the above methods, the organic solvent is kept in the capillary micro-extraction tube for a period of no more than 45 min.

The present invention has the following beneficial effects:
(1) The method disclosed by the present invention integrates such functions as separation, enrichment and injection into one device of microextraction tube injector, thereby improving the efficiency of sample pretreatment and reducing measurement error. In the traditional solid-phase extraction procedure, several milliliters of organic solvent are usually required to elute the adsorbed target compounds, and then the eluent containing the target compounds is concentrated to dry by nitrogen blowing when concentrations of the analytes in the eluent are below the detection limits of a gas chromatography, and the concentrated solution is then re-dissolved to a certain volume (tens to one hundred microliters) to form an injection solution, and finally a certain volume of the injection solution is sucked and injected using a micro syringe. In contrast, in the method disclosed by the present invention, the concentration procedure is no longer required, and the working efficiency of sample pretreatment can be improved. In addition, since the nitrogen blowing operation is omitted, the measurement error introduced from the operations such as nitrogen blowing and re-dissolving can be avoided necessarily.
(2) When a sample is pretreated with the method of the present invention, a higher enrichment efficiency can be achieved than conventional SPE adopted if the loading volume is identical. In prior art, when sample injection is performed using a micro syringe, the concentrated sample solution usually has a volume of tens to one hundred microliter, so as to ensure sufficient sample solution for cleaning the micro syringe, and meanwhile ensure the convenience in taking the injection solution with a micro syringe. In contrast, according to the method disclosed by the present invention, the sample is directly injected using the capillary micro-extraction tube, and only about two microliters of the organic solvent can be hold in the capillary micro-extraction tube serving as an injector, therefore, a higher enrichment factor can be obtained as proved by our experiments.

(3) The method disclosed by the present invention is more green and environment-friendly. Compared with a traditional solid-phase extraction method, the method disclosed by the invention has the following advantages: the usage of the organic solvent is reduced from milliliters to microliters, and the concentration process by nitrogen-blowing is no longer required, so the hazards of organic solvent volatilization to operators and environments can be reduced significantly.

(4) The method provided by the present invention is more suitable for pretreatment of the small volume sample. The method provided by the present invention has higher enrichment efficiency, so that less amount of the sample is required using the method disclosed by the present invention than using other methods if an analyte must be concentrated to an identical level.

BRIEF DESCRIPTION OF THE DRAWINGS

FIG. 1 shows a chromatogram (a) obtained by direct injection of the solution of fluorene in dichloromethane (1 mg/L) with a micro syringe and (b) obtained by treating an aqueous solution of fluorene (2 µg/L) and injecting with a micro-extraction tube injector according to the method of the present invention.

DETAILED DESCRIPTION

In order to better understand the present invention, the following embodiments further clarify the contents of the present invention, but the contents of the present invention are not limited to the following embodiments.

Embodiment 1

Fluorene, a polycyclic aromatic hydrocarbon, is used as a probe compound to investigate the enrichment effect of the method.

I. Preparation of a micro-extraction tube injector using a capillary micro-extraction tube 1. Pretreatment of Capillary Column (1) A quartz capillary tube (320 µm, I.D.) is rinsed with NaOH solution (1 mol/L) at a flow rate of 0.1 mL/min for 2 hours. After the tube is filled with NaOH solution, its two ends are sealed by silicone rubber and the tube is placed in an oven of a gas chromatography set at 50° C. for 2 hours;

(2) The tube is washed to neutral with ultrapure water at a flow rate of 0.2 mL/min; After washed with HCl solution (1 mol/L) at a flow rate of 0.1 mL/min for 1 h, the column then washed with ultrapure water to neutral;

(3) The tube is dried at 160° C. for 10 h under nitrogen atmosphere.

2. Preparation of octyl capillary micro-extraction tube

140 µL of tetraethoxysilane (TEOS) and 100 µL of n-octyltriethoxysilane (C8-TEOS) are added into a mixed solution of 300 µL of methanol, 20 µL of water and 20 µL of hydrochloric acid (0.5 mol/L), then the obtained mixture is stirred and kept in a water bath set at 60° C. for 3 hours; subsequently the resulted mixture is cooled to room temperature, and 10 mg of dodecylamine is added thereto and well mixed, and then the obtained solution is forced using a single-use syringe into the pretreated quartz capillary tube having a total length of 25 cm. The two ends of the tube are sealed with silicone rubber, and the reaction is performed at 40° C. for 12 hours. Then the capillary tube is rinsed with absolute ethyl alcohol for 3 hours to remove the dodecylamine and unreacted silane coupling agent, and finally the tube is dried in a drying oven at 60° C. for 48 hours. The dried tube is cut into small tubes of 5 cm for later use, wherein the extracting medium accounts for 50% of the internal volume of the capillary micro-extraction tube.

3. Preparation of an Injector Using the Capillary Micro-Extraction Tube

A syringe needle comprising a metal needle tube and a needle holder is provided. The metal needle tube is removed from the syringe needle, and a silicone septum with a proper size and a thickness of about 2.0 mm is pushed into the bottom of the needle holder. Then the capillary micro-extraction tube with the length of 5 cm vertically penetrates through the silicone septum pushed into the needle holder, so that the capillary micro-extraction tube can be fixed on the needle holder to obtain an injector for micro-extraction tube injection.

II. Sample Analysis

1. Sample: a fluorene aqueous solution (2 µg/L) is used as a sample solution; and a solution of fluorene in dichloromethane (1 mg/L) is used as a control group.

2. Sample Pretreatment and Sample Injection

The needle for micro-extraction tube injection (the needle) is tightly connected with a syringe barrel having a volume capacity of 1 ml. 0.5 ml of methanol and 0.3 ml of deionized water are sequentially driven to flow through the capillary micro-extraction tube by a syringe pump, so that the capillary micro-extraction tube is activated. 1 mL of the sample solution is added into the syringe barrel, and flows through the capillary micro-extraction tube at a flow rate of 60 µL/min driven by a syringe pump, so that the sample is loaded. Then, 0.2 ml of deionized water is added into the syringe barrel to wash the capillary micro-extraction tube driven by a syringe pump, and some air is forced to flow through the capillary micro-extraction tube with the aid of a syringe pump to remove water therein. The capillary micro-extraction tube is fully filled with isopropyl alcohol with the aid of a syringe pump, and the two ends of the capillary micro-extraction tube are sealed by a silicone septum and stood for 20 minutes. Finally, one end of the capillary micro-extraction tube is open by taking down the silicone septum thereof, and the open end is directly inserted into an injection port of a gas chromatography to fulfill injection procedure.

3. Analysis

Instrumentation: Analysis is performed on a gas chromatography equipped with a hydrogen flame ionization detector (GC-FID).

The main chromatographic conditions are as follows: the injection port is set at 250° C., split-less injection is adopted and the injection time is 2 min, and the detector temperature is 260° C. The oven temperature is programmed as follows: the initial temperature is 80° C. and held for 3 min, increased to 270° C. at 10° C./min, and finally increased to 290° C. at 40° C./min and held for 1 min.

4. Evaluation and Results

Sample solution (2 μg/L) is treated with micro-extraction tube injection (METI) according to the method of the present invention prior to analysis by GC-FID. For purposes of comparison, a standard solution (1 mg/L, injection volume is 1 μL) is also analyzed with GC-FID, and the results are shown in FIG. 1. The peak areas of the target compound in the chromatograms are integrated respectively, and the ratio of the peak areas is calculated. As a result, METI offers an enrichment factor of about 230 times for the concentration of Fluorene.

Embodiment 2

Seven kinds of organochlorine pesticides are used as probe compounds to investigate the application results of the method.

I. Preparation of a micro-extraction tube injector using a capillary micro-extraction tube: The preparation procedure is the same as Embodiment 1.

II. Sample Analysis

1. Sample: A mixed aqueous solution of seven organochlorine pesticides (α-HCH, β-HCH, γ-HCH, δ-HCH, P,P-DDE, P,P-DDD and O,P-DDT) is prepared for use as a sample solution, wherein each pesticide has a concentration of 100 ng/L in the mixed aqueous solution. A dichloromethane solution of the seven organochlorine pesticides mentioned above is prepared for use as a control group, wherein each pesticide has a concentration of 100 μg/L in the dichloromethane solution.

2. Sample pretreatment and sample injection: Sample pretreatment and injection are performed with the same method as Embodiment 1.

3. Analysis

Instrumentation: Analysis is performed on a gas chromatography equipped with a mass spectrometry detector (GC-MS).

The main chromatographic conditions are as follows: the injection port is set at 250° C., split-less injection is adopted and the injection time is 2 min. The oven temperature is programmed as follows: the initial temperature is 100° C. and held for 1 min, then increased to 280° C. at 10° C./min and held for 2 min. Data is recorded in selective ion monitoring (SIM).

4. Evaluation and Results

The mixed aqueous solution of seven organochlorine pesticides (100 ng/L) is treated with METI according to the method of the present invention prior to analysis by GC-MS (SIM). For purposes of comparison, a standard solution (100 μg/L, injection volume is 1 μL) is also analyzed with GC-MS (SIM). Signal-to-noise ratio of each compound is respectively calculated, and the results are shown in table 1. Table 1 shows that, when the concentration ratio of the target compound is 1000, the signal-to-noise ratio of the seven organochlorine pesticides in dichloromethane directly injected using a micro syringe and the signal-to-noise ratio of the seven target compounds in the sample aqueous solution treated with METI according to the present invention has a ratio in the range from 3.8 to 25.1. Therefore, it is proved that the sample pretreatment method of microextraction tube injection (METI) disclosed by the present invention has a very good enrichment effect.

TABLE 1

Signal-to-noise ratio of organic chlorine pesticides before and after METI

| Aanalytes | Signal-to-noise ratio | | Concentration ratio | Ratio of signal-to-noise ratio |
|---|---|---|---|---|
| | Direct injection (100 μg/L) | METI (100 ng/L) | | |
| α-HCH | 1530 | 250 | 1000 | 6.1 |
| β-HCH | 1838 | 298 | 1000 | 6.2 |
| γ-HCH | 657 | 175 | 1000 | 3.8 |
| δ-HCH | 2308 | 441 | 1000 | 5.2 |
| P,P-DDE | 7801 | 311 | 1000 | 25.1 |
| P,P-DDD | 1928 | 327 | 1000 | 5.9 |
| O,P-DDT | 1569 | 136 | 1000 | 11.5 |

Apparently, the above-described embodiments are merely examples for purposes of clarity and are not intended to limit the embodiments. For a person of ordinary skill in the art, other different forms of variations or changes can be made on the basis of the above description. There is no need and it is impossible to give all embodiments in an exhaustive manner. Therefore, the obvious variations or changes of the approach are still within the protection scope of the present invention.

What is claimed is:

1. A sample pretreatment method of microextraction tube injection, comprising:
   providing a capillary micro-extraction tube with extracting medium in it as an injector,
   passing a sample through the capillary micro-extraction tube, during which an analyte is extracted into the extracting medium inside the capillary micro-extraction tube;
   then, filling the capillary micro-extraction tube with an organic solvent and keeping the filling for a certain period of time, so that the extracted analyte is dissolved in the organic solvent inside the capillary micro-extraction tube to form an injection solution; and
   finally, keeping one end of the capillary micro-extraction tube sealed and inserting the open end directly into an injection port of a gas chromatography, such that the injection solution is automatically ejected out from the capillary micro-extraction tube into the injection port to complete the injection operation for gas chromatography;
   wherein, the extracting medium inside the capillary micro-extraction tube does not exceed 90% of the total internal volume of the capillary micro-extraction tube;
   the organic solvent is kept in the capillary micro-extraction tube for a period of no more than 45 min;
   the sample solution flows through the capillary micro-extraction tube at a flow rate not exceeding 1 mL/min.

2. The sample pretreatment method according to claim 1, comprising:
   (1) preparing a micro-extraction injector from a capillary micro-extraction tube;
   (2) tightly connecting the micro-extraction injector with a barrel of a syringe, and activating the capillary micro-extraction tube by passing an activation liquid through the capillary micro-extraction tube by the aid of a syringe pump;
   (3) loading a sample solution by passing the sample solution through the capillary micro-extraction tube at a certain flow rate by the aid of a syringe pump;
   (4) washing the capillary micro-extraction tube by passing a cleaning liquid through the capillary micro-extraction tube by the aid of a syringe pump, and removing water inside the capillary micro-extraction tube as much as possible by forcing some air to flow through the capillary micro-extraction tube;

(5) filling the capillary micro-extraction tube fully with a proper organic solvent using a syringe pump, sealing two ends of the capillary micro-extraction tube with silicone septums at each end, and standing for a period of time, so that the extracted analyte is dissolved in the organic solvent to form an injection solution; and (6) finally, opening one end of the capillary micro-extraction tube by taking down the silicone septum thereof, keeping the other end sealed, and inserting the open end directly into an injection port of a gas chromatography, such that the injection solution is automatically ejected out from the capillary micro-extraction tube into the injection port to complete the sample injection operation.

3. The sample pretreatment method according to claim 1, wherein the capillary micro-extraction tube has an inner diameter of 0.05 mm to 0.6 mm, an outer diameter of 0.06 mm to 0.7 mm, and a length of 2 cm to 10 cm.

4. The sample pretreatment method according to claim 2, wherein the capillary micro-extraction tube has an inner diameter of 0.05 mm to 0.6 mm, an outer diameter of 0.06 mm to 0.7 mm, and a length of 2 cm to 10 cm.

* * * * *